Patented Mar. 9, 1937

2,073,098

UNITED STATES PATENT OFFICE 2,073,098

SEPARATION OF VAT DYESTUFF ISOMERS OF THE NAPHTHOYLENE DIARYLIMID-AZOLE SERIES

Wilhelm Eckert and Heinrich Sieber, Frankfort-on-the-Main-Hoechst, Germany, assignors to General Aniline Works, Inc., New York, N. Y., a corporation of Delaware No Drawing. Application March 1, 1934, Serial No. 713,614. In Germany March 7, 1933

5 Claims. (Cl. 260—44)

The present invention relates to a process of separating the mixtures of isomeric 1,4,5,8-naphthoylene-diarylimidazoles of the general constitution:

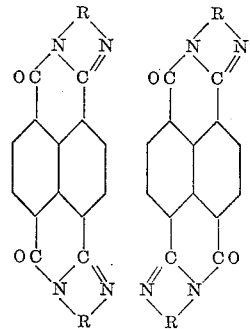

wherein R stands for aryl, especially for an aryl group of the benzene and naphthalene series, obtainable by condensing a 1,4,5,8-naphthalene-tetra-carboxylic acid compound with an ortho-diamine compound, especially one of the benzene and naphthalene series, into their components and to new dyestuffs obtained thereby.

We have found that the constituents of these mixtures are separated easily and with a good yield by treating the mixtures containing the isomers in the presence of an inert solvent or diluent which is miscible with water, such as alcohol, pyridine or the like, with a condensing agent of the class consisting of alkali metal amides and alkali metal alcoholates, such as, for instance, sodium amide or sodium alcoholate, at a temperature between about 40° C. and about 80° C., advantageously at 60° C.–70° C., separating the addition products thus formed by taking advantage of the fact that they differ in their solubility and by decomposing them separately, for instance, by hydrolysis. It is also possible to effect the condensation to the dyestuff mixtures as above described and to separate the mixtures of isomers without isolating the latter.

The following examples serve to illustrate the invention but they are not intended to limit it thereto, the parts being by weight:

(1) 10 parts of the dyestuff obtainable by condensation of naphthalene-1,4,5,8-tetra-carboxylic acid with ortho-phenylene-diamine (for instance, according to U. S. Patent No. 1,588,451 and Reissue No. 18,643) are heated to 60° C.–70° C. with 100 parts of alcohol and about 20 parts of pulverized sodium amide. The reaction is finished after 2-3 hours. After cooling, the addition product which has been precipitated is filtered with suction and washed with alcohol which has been rendered alkaline by means of caustic alkali. It is a colorless powder and, by addition of water, is hydrolyzed to form the orange dyestuff (transform) which corresponds in its properties with that produced according to Example 1 of U. S. Patent No. 1,927,928. From the alcoholic filtrate there precipitates, on addition of water, the red isomer (cis-form); this dyestuff is also identical with that of U. S. Patent No. 1,927,928.

(2) 30 parts of the dyestuff used in Example 1 are heated to 60° C.–70° C. together with 60 parts of sodium ethylate and 300 parts of alcohol. When the reaction is finished—which can be ascertained by the change of the color of the mixture—the whole is allowed to cool and filtered with suction. The residue is washed with alcohol which has been rendered alkaline by means of caustic alkali, until a colorless filtrate is obtained, and introduced into water whereby the orange colored dyestuff separates in the form of a fine paste. The red isomer remains dissolved in the filtrate and may be obtained therefrom by precipitation with water.

By using in this example sodium methylate instead of sodium ethylate, the same result is obtained.

(3) 10 parts of the dyestuff obtainable by condensation of 2-bromo-1,4,5,8-naphthalene-tetra-carboxylic acid with 1-methyl-3,4-diaminobenzene are heated with 10 times their weight of alcohol and twice the quantity of finely powdered sodium amide at 60° C.–70° C. until the red dyestuff has been entirely converted into the colorless addition compound. After cooling, the salt-like compound which has separated is filtered with suction, washed with alcohol which has been rendered alkaline and hydrolyzed by introduction into water (trans-form). The isomeric part of the dyestuff mixture (cis-form) is obtained from the alcoholic filtrate. Whereas the parent material dyes cotton red brown, the trans-isomer yields scarlet tints and the cis-isomer Bordeaux tints. The dyestuffs thus obtained are new products.

(4) 50 parts of the product obtainable by condensation of 2-bromo-1,4,5,8-naphthalene-tetra-carboxylic acid with 1-ethoxy-3,4-diaminobenzene are heated for some hours at 60° C.–70° C. with 500 parts of alcohol and 100 parts of sodium ethylate. After cooling, the addition compound which has separated is filtered with suction. The product is further worked up in a manner very similar to that described in Example 2. The parent material yields bluishbrown tints, the trans-isomer yellowish-brown tints and the cis-isomer violet brown tints.

The dyestuffs thus obtainable are new products.

We claim:

1. The process which comprises heating at a temperature of about 40° C. to about 80° C. a mixture of isomeric 1,4,5,8-naphthoylene-diarylimidazoles obtainable by condensing a 1,4,-5,8-naphthalene-tetra-carboxylic acid compound with an ortho-diamine compound of the benzene and naphthalene series, with a condensing agent of the class consisting of alkali metal amides and alkali metal alcoholates in the presence of an inert solvent miscible with water and separating the isomeric addition compounds from each other by taking advantage of their different solubility.

2. The process which comprises heating at a temperature of about 40° C. to about 80° C. a mixture of isomeric 1,4,5,8-naphthoylene-dibenzoimidazoles obtainable by condensing a 1,4-5,8-naphthalene-tetra-carboxylic acid compound with an ortho-diamine compound of the benzene series, with a condensing agent of the class consisting of alkali metal amides and alkali metal alcoholates in the presence of alcohol, separating the isomeric addition compounds from each other by taking advantage of their different solubility and individually decomposing them.

3. The process which comprises heating for 2 to 3 hours at a temperature of about 60° C. to about 70° C. a mixture of isomeric 1,4,5,8-naphthoylene-dibenzoimidazoles obtainable by condensing 1,4,5,8-naphthalene-tetra-carboxylic acid with ortho-phenylene-diamine, with sodium amide in the presence of alcohol, separating the isomeric addition compounds from each other by taking advantage of their different solubility and individually decomposing them.

4. The process which comprises heating for some hours at a temperature of about 60° C. to about 70° C. a mixture of isomeric 1,4,5,8-naphthoylene-dibenzoimidazoles obtainable by condensing 2-bromo-1,4,5,8-naphthalene-tetra-carboxylic acid with 1-methyl-3,4-diaminobenzene, with sodium amide in the presence of alcohol, separating the isomeric addition compounds from each other by taking advantage of their different solubility and individually decomposing them.

5. The process which comprises heating for some hours at a temperature of about 60° C. to about 70° C. a mixture of isomeric 1,4,5,8-naphthoylene-dibenzoimidazoles obtainable by condensing 2-bromo-1,4,5,8-naphthalene-tetra-carboxylic acid with 1-ethoxy-3,4-diaminobenzene, with sodium ethylate in the presence of alcohol, separating the isomeric addition compounds from each other by taking advantage of their different solubility and individually decomposing them.

WILHELM ECKERT.
HEINRICH SIEBER.